(12) United States Patent
Yin et al.

(10) Patent No.: US 12,414,059 B2
(45) Date of Patent: Sep. 9, 2025

(54) DATA PROCESSING METHOD AND APPARATUS THEREFOR

(71) Applicant: HUAWEI TECHNOLOGIES CO., LTD., Guangdong (CN)

(72) Inventors: Zhaogen Yin, Shanghai (CN); Jinli Yang, Shanghai (CN); Ziqiang Wang, Shanghai (CN); Jihong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 389 days.

(21) Appl. No.: 18/189,983

(22) Filed: Mar. 24, 2023

(65) Prior Publication Data

US 2023/0232347 A1 Jul. 20, 2023

Related U.S. Application Data

(63) Continuation of application No. PCT/CN2021/119307, filed on Sep. 18, 2021.

(30) Foreign Application Priority Data

Sep. 25, 2020 (CN) .......................... 202011027435.7

(51) Int. Cl.
*H04W 56/00* (2009.01)
*H04L 43/0864* (2022.01)

(52) U.S. Cl.
CPC ....... *H04W 56/001* (2013.01); *H04L 43/0864* (2013.01)

(58) Field of Classification Search
CPC ........... H04W 56/001; H04W 56/0065; H04W 56/0015; H04W 56/004; H04L 43/0864; H04J 3/0638; H04J 3/0682
See application file for complete search history.

(56) References Cited

U.S. PATENT DOCUMENTS

| 2014/0056318 | A1 | 2/2014 | Hansson et al. |
| 2016/0192304 | A1* | 6/2016 | Yi ..................... H04W 52/0206 370/328 |

(Continued)

FOREIGN PATENT DOCUMENTS

| CN | 103889044 A | 6/2014 |
| CN | 108616977 A | 10/2018 |

(Continued)

OTHER PUBLICATIONS

Extended European Search Report in European ApplN No. 21871448.3, dated Feb. 23, 2024, 13 pages.

(Continued)

*Primary Examiner* — Kyaw Z Soe
(74) *Attorney, Agent, or Firm* — Fish & Richardson P.C.

(57) ABSTRACT

Example data processing methods, network devices, and media are disclosed. One example method includes obtaining, by a first network device, N pieces of first round-trip time in a first periodicity. The first round-trip time is time consumed when the first network device and a second network device each transmit a packet once through an Xn/X2 interface. A minimum first round-trip time reference value is determined based on the N pieces of first round-trip time. The minimum first round-trip time reference value is a smallest value of the N pieces of first round-trip time. An inter-site synchronization offset value of the first periodicity is determined based on the minimum first round-trip time reference value. The inter-site synchronization offset value of the first periodicity is an inter-site synchronization offset value that exists when the first network device and the second network device transmit packets through the Xn/X2 interface.

20 Claims, 7 Drawing Sheets

(56) References Cited

U.S. PATENT DOCUMENTS

2018/0132199 A1    5/2018  Zhang et al.
2018/0152281 A1    5/2018  Zigelboim et al.

FOREIGN PATENT DOCUMENTS

CN       109309937   A    2/2019
CN       110266420   A    9/2019
CN       111416751   A    7/2020
WO       2006122499  A1   11/2006

OTHER PUBLICATIONS

Office Action in Indian Appln. No. 202337018917, mailed on Sep. 5, 2023, 7 pages (with English translation).

IEEE Std 1588-2008 (Revision of IEEE Std 1588-2002), "IEEE Standard for a Precision Clock Synchronization Protocol for Networked Measurement and Control Systems, IEEE Instrumentation and Measurement Society," Jul. 24, 2008, 289 pages.

International Search Report and Written Opinion in International Appln. No. PCT/CN2021/119307, mailed on Dec. 22, 2021, 15 pages (with English translation).

\* cited by examiner

DATA PROCESSING METHOD AND APPARATUS THEREFOR

CROSS-REFERENCE TO RELATED APPLICATIONS

This application is a continuation of International Application No. PCT/CN2021/119307, filed on Sep. 18, 2021, which claims priority to Chinese Patent Application No. 202011027435.7, filed on Sep. 25, 2020. The disclosures of the aforementioned applications are hereby incorporated by reference in their entireties.

TECHNICAL FIELD

Embodiments of this application relate to the field of communication technologies, and specifically, to a data processing method and an apparatus therefor.

BACKGROUND

In a 5G era, mainstream spectrums use a time division duplexing (TDD) mode. A TDD system is a strict clock synchronization system. If a base station is out of synchronization, downlink of the out-of-synchronization base station may interfere with uplink of another synchronized base station, and downlink of the synchronized base station may also interfere with uplink of the out-of-synchronization base station. This severely deteriorates service experience.

A base station may detect an internal clock system fault and report an alarm to notify users. With product improvement, there are less internal clock system faults. For an external clock source fault, particularly in the case of clock initial deviation or slow deviation, sites on an entire network/in a region are mainly selected for inter-site comparison.

Inter-site comparison is performed based on inter-site synchronization offset measurement. The inter-site offset measurement technology using an Xn/X2 interface depends on a transmission network. When burst/congestion jitter occurs on the transmission network, a large error is caused to an offset measurement result, affecting determining of an inter-site synchronization status.

SUMMARY

According to a data processing method provided in embodiments of this application, N pieces of first round-trip time are obtained in a first periodicity, a minimum first round-trip time reference value is determined based on the N pieces of first round-trip time, and then an inter-site synchronization offset value is determined based on the minimum first round-trip time reference value. This reduces a risk of a large error in an offset measurement result caused by an excessively high delay arising from jitter in the case of burst or congestion.

A first aspect of this application provides a data processing method.

A first network device obtains N pieces of first round-trip time in a first periodicity. The first round-trip time is time consumed when the first network device and a second network device each transmit a packet once through an Xn/X2 interface. N is a positive integer greater than 1. The first network device determines a minimum first round-trip time reference value based on the N pieces of first round-trip time. The minimum first round-trip time reference value is a smallest value of the N pieces of first round-trip time. The first network device determines an inter-site synchronization offset value of the first periodicity based on the minimum first round-trip time reference value. The inter-site synchronization offset value of the first periodicity is an inter-site synchronization offset value that exists when the first network device and the second network device transmit packets through the Xn/X2 interface.

In this embodiment of this application, the N pieces of first round-trip time are obtained in the first periodicity, the minimum first round-trip time reference value is determined based on the N pieces of first round-trip time, and then the inter-site synchronization offset value is determined based on the minimum first round-trip time reference value. This reduces a risk of a large error in an offset measurement result caused by an excessively high delay arising from jitter in the case of burst or congestion.

Based on the data processing method in the first aspect, in a possible implementation, that a first network device obtains N pieces of first round-trip time in a first periodicity includes: Step 1: The first network device sends a first detection packet to the second network device. The first detection packet carries first sending time. The first sending time is time at which the first network device sends the first detection packet to the second network device. Step 2: The first network device receives a second detection packet sent by the second network device. The second detection packet carries first receiving time and second sending time. The first receiving time is time at which the second network device receives the first detection packet. The second sending time is time at which the second network device sends the second detection packet. Step 3: The first network device determines second receiving time. The second receiving time is time at which the first network device receives the second detection packet. Step 4: The first network device determines the first round-trip time based on the first sending time, the first receiving time, the second sending time, and the second receiving time. The first network device performs step 1 to step 4 for N times in the first periodicity, to obtain the N pieces of first round-trip time.

In this embodiment of this application, the N pieces of first round-trip time are obtained in a manner of packet transmission between the first network device and the second network device, so that implementability of this solution is improved.

Based on the data processing method in the first aspect, in a possible implementation, that the first network device determines the first round-trip time based on the first sending time, the first receiving time, the second sending time, and the second receiving time includes:

$$\text{RTT} = t_2 - t_1 + t_4 - t_3.$$

RTT represents the first round-trip time, $t_2$ represents the first receiving time, $t_1$ represents the first sending time, $t_4$ represents the second receiving time, and $t_3$ represents the second sending time.

In this embodiment of this application, the first round-trip time is obtained through calculation according to a specific formula, so that the implementability of this solution is improved.

Based on the data processing method in the first aspect, in a possible implementation, that the first network device determines an inter-site synchronization offset value of the first periodicity based on the minimum first round-trip time reference includes:

$$\text{Offset} = t_{2min} - t_{1min} - \text{RTT}_{min}/2.$$

Offset represents the inter-site synchronization offset value of the first periodicity, $t_{2min}$ represents first receiving time corresponding to the minimum first round-trip time reference, $t_{1min}$ represents first sending time corresponding to the minimum first round-trip time reference, and $RTT_{min}$ represents the minimum first round-trip time reference.

In this embodiment of this application, the first round-trip time is obtained through calculation according to a specific formula, so that the implementability of this solution is improved.

Based on the data processing method in the first aspect, in a possible implementation, the first network device obtains M pieces of round-trip time in a second periodicity. M is less than N. The second periodicity is less than the first periodicity. The first network device determines a minimum first round-trip time real-time value based on the M pieces of round-trip time. The minimum first round-trip time real-time value is a smallest value of the M pieces of round-trip time. The first network device determines an inter-site synchronization offset value of the second periodicity based on the minimum first round-trip time real-time value if a difference between the minimum first round-trip time real-time value and the minimum first round-trip time reference value is less than a preset threshold.

In this embodiment of this application, the M first round-trip time is obtained, and the inter-site synchronization offset value of the second periodicity is determined based on the minimum first round-trip time real-time value, so that real-time performance of execution of this solution is improved.

Based on the data processing method in the first aspect, in a possible implementation, the first network device obtains an air interface offset measurement value. The air interface offset measurement value is a synchronization offset value that exists when the first network device and the second network device transmit packets through an air interface. The first network device determines a static error value based on the air interface offset measurement value and the inter-site synchronization offset value of the first periodicity. The static error value is a fixed value of a delay offset that exists when the first network device and the second network device transmit packets. The first network device stores the static error value.

In this embodiment of this application, the static error value is calculated based on the air interface offset measurement value, so that the implementability of this solution is improved.

Based on the data processing method in the first aspect, in a possible implementation, after that the first network device determines a static error value based on the air interface offset measurement value and the inter-site synchronization offset value of the first periodicity, the first network device compensates the inter-site synchronization offset value of the first periodicity based on the static error value, to obtain a target inter-site synchronization offset value.

In this embodiment of this application, the inter-site synchronization offset value of the first periodicity is compensated based on the static error value, so that accuracy of the inter-site synchronization offset value is improved.

A second aspect of embodiments of this application provides a network device.

The network device includes:
an obtaining unit, configured to obtain N pieces of first round-trip time in a first periodicity, where the first round-trip time is time consumed when a first network device and a second network device each transmit a packet once through an Xn/X2 interface, and N is a positive integer greater than 1; and a determining unit, configured to determine a minimum first round-trip time reference value based on the N pieces of first round-trip time, where the minimum first round-trip time reference value is a smallest value of the N pieces of first round-trip time.

The determining unit is further configured to determine an inter-site synchronization offset value of the first periodicity based on the minimum first round-trip time reference value. The inter-site synchronization offset value of the first periodicity is an inter-site synchronization offset value that exists when the first network device and the second network device transmit packets through the Xn/X2 interface.

Optionally, the network device further includes:
a sending unit, configured to send a first detection packet to the second network device in step 1, where the first detection packet carries first sending time, and the first sending time is time at which the first network device sends the first detection packet to the second network device; and a receiving unit, configured to receive a second detection packet sent by the second network device in step 2, where the second detection packet carries first receiving time and second sending time, the first receiving time is time at which the second network device receives the first detection packet, and the second sending time is time at which the second network device sends the second detection packet.

Step 3: The determining unit is further configured to determine second receiving time. The second receiving time is time at which the first network device receives the second detection packet.

Step 4: The determining unit is further configured to determine the first round-trip time based on the first sending time, the first receiving time, the second sending time, and the second receiving time.

The network device performs step 1 to step 4 for N times in the first periodicity, to obtain the N pieces of first round-trip time.

Optionally, the network device further includes:
a calculation unit, configured to perform calculation in the following manner:

$$RTT = t_2 - t_1 + t_4 - t_3.$$

RTT represents the first round-trip time, $t_2$ represents the first receiving time, $t_1$ represents the first sending time, $t_4$ represents the second receiving time, and $t_3$ represents the second sending time.

Optionally, the calculation unit is further configured to perform calculation in the following manner:

$$Offset = t_{2min} - t_{1min} - RTT_{min}/2.$$

Offset represents the inter-site synchronization offset value of the first periodicity, $t_{2min}$ represents first receiving time corresponding to the minimum first round-trip time reference, $t_{1min}$ represents first sending time corresponding to the minimum first round-trip time reference, and $RTT_{min}$ represents the minimum first round-trip time reference.

Optionally, the obtaining unit is further configured to obtain M pieces of round-trip time in a second periodicity. M is less than N. The second periodicity is less than the first periodicity.

The determining unit is further configured to determine a minimum first round-trip time real-time value based on the M pieces of round-trip time. The minimum first round-trip time real-time value is a smallest value of the M pieces of round-trip time.

The determining unit is further configured to determine an inter-site synchronization offset value of the second periodicity based on the minimum first round-trip time real-time value if a difference between the minimum first round-trip time real-time value and the minimum first round-trip time reference value is less than a preset threshold.

Optionally, the obtaining unit is further configured to obtain an air interface offset measurement value. The air interface offset measurement value is a synchronization offset value that exists when the first network device and the second network device transmit packets through an air interface.

The determining unit is further configured to determine a static error value based on the air interface offset measurement value and the inter-site synchronization offset value of the first periodicity. The static error value is a fixed value of a delay offset that exists when the first network device and the second network device transmit packets.

The network device further includes:
a storing unit, configured to store the static error value.
Optionally, the network device further includes:
a compensation unit, configured to compensate the inter-site synchronization offset value of the first periodicity based on the static error value, to obtain a target inter-site synchronization offset value.

The method performed by the units in the network device according to the second aspect of this application is similar to the method according to the implementations of the first aspect. Details are not described herein again.

A third aspect of this application provides a network device, including a processor and a memory. The processor stores program code. The processor executes the program code to implement the method according to the first aspect and the implementations of the first aspect of this application.

A fourth aspect of this application provides a computer storage medium. The computer storage medium stores instructions. When the instructions are executed on a computer, the computer is enabled to perform the method according to the implementations of the first aspect of this application.

According to the foregoing technical solutions, it can be learned that embodiments of this application have the following advantages:

In this application, the first network device obtains the N pieces of first round-trip time in the first periodicity, determines the minimum first round-trip time reference value based on the N pieces of first round-trip time, and then determines the inter-site synchronization offset value based on the minimum first round-trip time reference value. This reduces a risk of a large error in an offset measurement result caused by an excessively high delay arising from jitter in the case of burst or congestion.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

To better understand a data processing method disclosed in embodiments of this application, the following first describes a communication system to which embodiments of this application are applicable.

Figure 1:
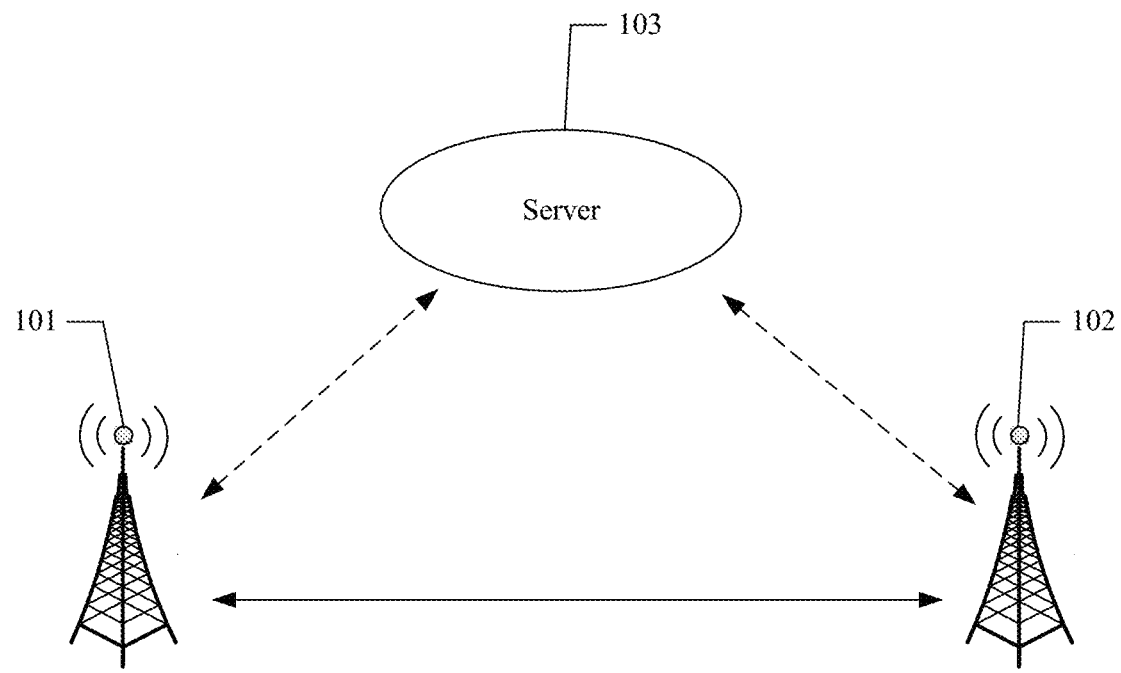
FIG. 1 is a diagram of an architecture of a communication system according to an embodiment of this application.

FIG. 1 is a schematic diagram of an architecture of a communication system according to an embodiment of this application. The communication system includes a first network device 101 and a second network device 102. A quantity and a form of network devices shown in FIG. 1 are merely used as an example, and do not constitute a limitation on embodiments of this application. During actual application, there may be at least two network devices. This is not specifically limited herein. The communication system provided in this embodiment of this application may further include a server 103. The server 103 is connected to the first network device 101 and the second network device 102, and is configured to transmit data to the first network device 101 and the second network device 102.

The technical solutions in embodiments of this application may be applied to various communication systems. For example, the technical solutions in embodiments of this application may be applied to a 5th generation (5G) mobile communication system, a 5G NR system, another future new mobile communication system, or the like. The communication system may alternatively be a communication system that simultaneously supports a plurality of wireless technologies, for example, a communication system that simultaneously supports LTE and NR. The communication system may alternatively be a communication system that supports near field communication, for example, a communication system that supports a sidelink (SL) technology, and a communication system that supports a wireless fidelity (Wi-Fi) technology.

The first network device 101 and the second network device 102 in embodiments of this application are entities that are on a network side and that are configured to transmit or receive a signal. For example, the first network device 101 may be an evolved NodeB (eNB), a transmission point (TRP), a next generation NodeB (gNB) in an NR system, a transmission reception point (TRP), a relay node (RN), an access point (AP), a base station in another future mobile communication system, an access node in a Wi-Fi system, or the like. A specific technology and a specific device form that are used by the network device are not limited in this embodiment of this application.

Notably, in this embodiment of this application, the first network device 101 may transmit data with the second network device 102 through an Xn/X2 interface, to perform inter-site offset measurement, or may transmit data by using an air interface transmission technology, to perform inter-site offset measurement.

Notably, the server 103 may be deployed on the first network device 101 or the second network device 102, or may be used as a separate server to connect to the first network device 101 and the second network device 102, or may be deployed in an intermediate transmission network, or may be deployed on another network device. This is not specifically limited herein.

Notably, in this embodiment of this application, the inter-site offset measurement may be performed on the first network device 101 or the second network device 102, or may be performed on the server 103. This is not specifically limited herein. When the inter-site offset measurement is performed on the first network device 101 or the second network device 102, the server 103 is not needed. When the inter-site offset measurement is performed on the server 103, the first network device 101 and the second network device 102 send related data information to the server 103. It may be understood that, the inter-site offset measurement may alternatively be performed on the intermediate transmission network or another network device. This is not specifically limited herein.

Figure 2:
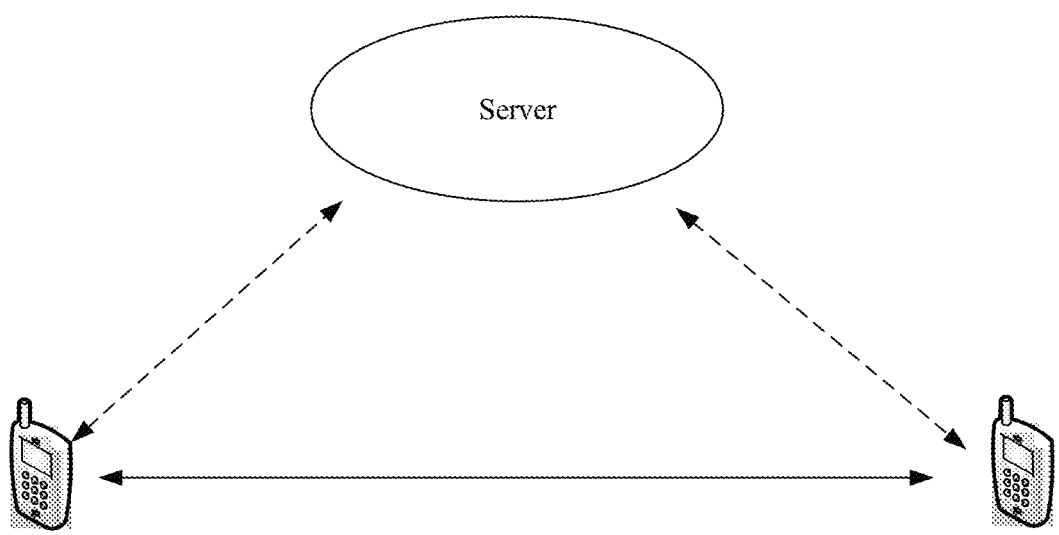
FIG. 2 is a diagram of an architecture of a communication system according to an embodiment of this application.

Notably, a data processing method provided in this embodiment of this application may be further used to perform delay offset measurement between terminal devices. As shown in FIG. 2, data is transmitted between terminal devices, to perform delay offset measurement. The delay offset measurement may be performed between the terminal devices, or may be performed on a server. This is not specifically limited herein. When the delay offset measurement is performed on the terminal devices, the server is not needed. When the delay offset measurement is performed on the server, the terminal devices send related data information to the server. It may be understood that the delay offset measurement may alternatively be performed on an intermediate transmission network or another device. This is not specifically limited herein.

The terminal devices in this embodiment of this application are entities, for example, mobile phones, that are on a user side and that are configured to receive or transmit a signal. The terminal device may also be referred to as a terminal, user equipment (UE), a mobile station (MS), a mobile terminal (MT), or the like. The terminal device may be a vehicle, an intelligent vehicle, a mobile phone, a wearable device, a tablet computer (Pad), a computer having a wireless transceiver function, a virtual reality (VR) terminal device, or an augmented reality (AR) terminal device that has a communication function, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

The following describes in detail a data processing method and an apparatus therefor provided in embodiments of this application with reference to the communication systems in FIG. 1 and FIG. 2.

Figure 3:
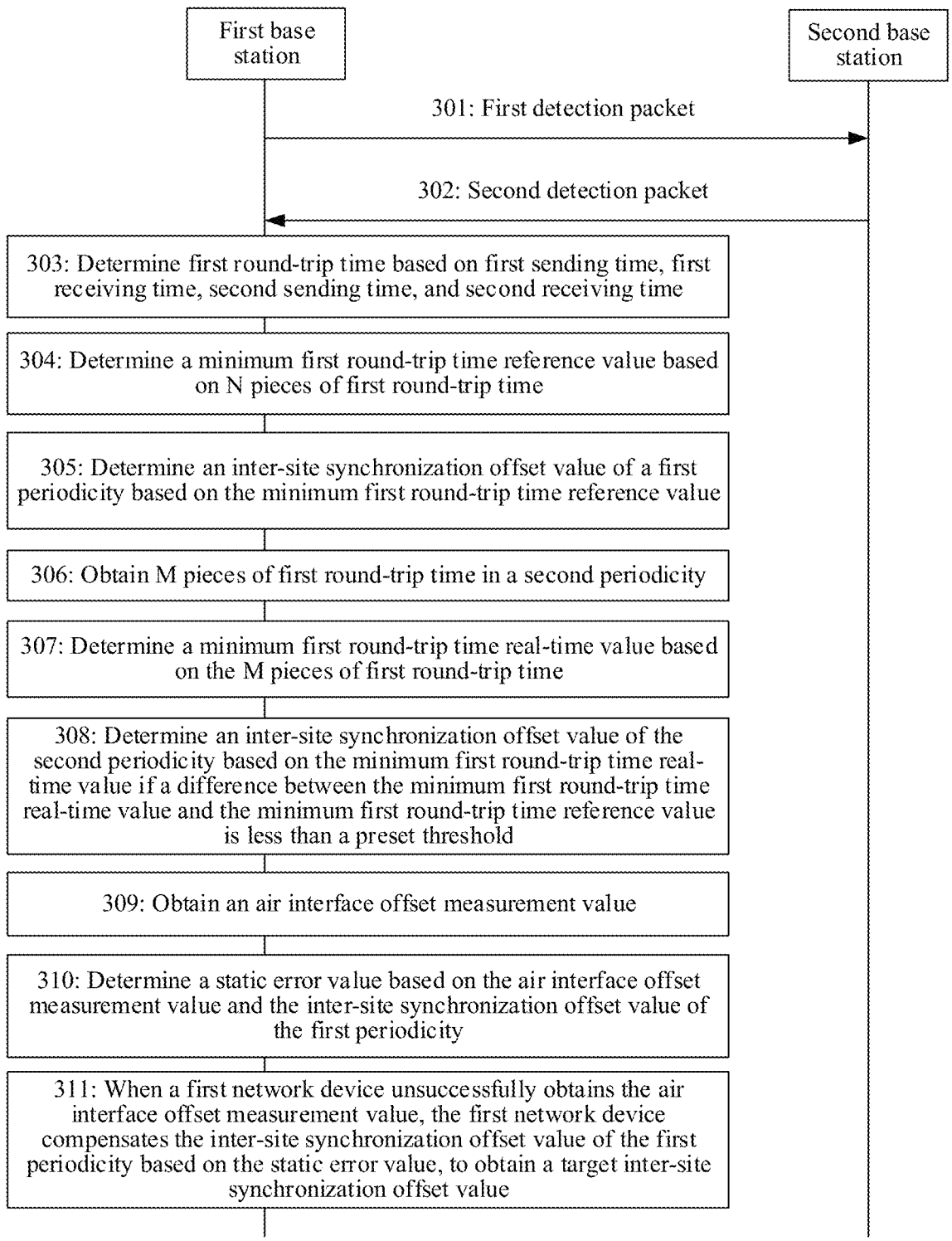
FIG. 3 is a schematic flowchart of a data processing method according to an embodiment of this application.

FIG. 3 is a schematic flowchart of a data processing method according to an embodiment of this application.

In this embodiment, an example in which a first network device is a first base station, and a second network device is a second base station is used for description. In this embodiment, an example in which inter-site offset measurement is performed on the first base station and the second base station is used for description.

In step 301, the first base station sends a first detection packet to the second base station.

When the first base station needs to perform inter-site offset measurement, the first base station sends the first detection packet to the second base station.

Specifically, when the first base station sends the first detection packet to the second base station, the first base station records time information of sending the first detection packet, namely, first sending time. The first base station includes the first sending time in the first detection packet, and sends the first detection packet to the second base station.

In a possible implementation, the first detection packet is a service packet. The base station includes the first sending time in the service packet, and sends the service packet to the second base station. Specifically, the first sending time may be carried in a packet header of the service packet, or may be carried in a payload of the service packet. This is not specifically limited herein.

In a possible implementation, the first detection packet is a specially constructed detection packet. To be specific, the first detection packet does not carry other service information, but carries only the first sending time. Specifically, the first sending time may be carried in a packet header of the first detection packet, or may be carried in a payload of the first detection packet. This is not specifically limited herein.

In a possible implementation, precision of timestamping the first detection packet by the first base station is adjusted to the highest. For example, the precision of timestamping may be set to be within 10 μs. Alternatively, in a preferred manner, the precision of timestamping is set to 1 μs.

Notably, a periodicity of exchanging detection packets between the first base station and the second base station may be at a hundred millisecond level or at a second level. This is not limited in this embodiment of this application.

In step 302, the second base station sends a second detection packet to the first base station.

After the second base station receives the first detection packet sent by the first base station, the second base station sends the second detection packet to the first base station.

Specifically, after the second base station receives the first detection packet sent by the first base station, the second base station records time information of receiving the first detection packet, namely, first receiving time. When the second base station sends the second detection packet to the second base station, the second base station records time information of sending the second detection packet, namely, second sending time. The first base station includes the second sending time and the first receiving time in the second detection packet, and sends the second detection packet to the second base station.

In a possible implementation, the second detection packet is a service packet. The second base station includes the second sending time and the first receiving time in the service packet, and sends the service packet to the first base station. Specifically, the second sending time and the first receiving time may be carried in a packet header of the service packet, or may be carried in a payload of the service packet. This is not specifically limited herein.

In a possible implementation, the second detection packet is a specially constructed detection packet. To be specific, the second detection packet does not carry other service information, but carries only the second sending time and the first receiving time. Specifically, the first sending time and the first receiving time may be carried in a packet header of the second detection packet, or may be carried in a payload of the second detection packet. This is not specifically limited herein.

In a possible implementation, precision of timestamping the second detection packet by the second base station is adjusted to the highest. For example, the precision of timestamping may be set to be within 10 μs. Alternatively, in a preferred manner, the precision of timestamping is set to 1 μs.

In step 303, the first base station determines first round-trip time based on the first sending time, the first receiving time, the second sending time, and second receiving time.

After receiving the second detection packet sent by the second base station, the first base station records a time of receiving the second detection packet, namely, the second receiving time. The first base station determines the first round-trip time based on the first sending time, the first receiving time, the second sending time, and the second receiving time.

Specifically, after receiving the second detection packet, the first base station obtains the second sending time and the first receiving time in the second detection packet, records the second receiving time of receiving the second detection packet, and determines the first round-trip time by calculation based on the first sending time, the first receiving time, the second sending time, and the second receiving time. The first round-trip time indicates time consumed when the first base station and the second base station transmit the first detection packet and the second detection packet through an Xn/X2 interface, that is, represents time consumed when the first base station and the second base station each transmit a packet once through the Xn/X2 interface.

In a possible implementation, the first base station calculates the first round-trip time according to the following formula:

$$RTT = t_2 - t_1 + t_4 - t_3.$$

RTT represents the first round-trip time, $t_2$ represents the first receiving time, namely, time at which the second base station receives the first detection packet, $t_1$ represents the first sending time, namely, time at which the first base station sends the first detection packet, $t_4$ represents the second receiving time, namely, the time at which the first base station receives the second detection packet, and $t_3$ represents the second sending time, namely, time at which the second base station sends the second detection packet. $t_2 - t_1$ represents a delay from sending the first detection packet by the first base station to receiving the first detection packet by the second base station. $t_4 - t_3$ represents a delay from sending the second detection packet by the second base station to receiving the second detection packet by the first base station.

In an actual application process, a time for obtaining the first round-trip time by calculation is very short. In this embodiment of this application, the first round-trip time is obtained through calculation for a plurality of times in one periodicity, to reduce impact caused by jitter when the first base station and the second base station use the Xn/X2 interface. Therefore, the first base station repeats the step of calculating the first round-trip time for N times in a first periodicity, to obtain N pieces of first round-trip time. N is greater than 1.

Notably, the first periodicity may be set in a unit of hour, or may be set in a unit of day. This is not specifically limited herein. In a preferred manner, the first periodicity is set to one day or one hour. For example, in the first periodicity, the first base station obtains thousands of pieces of first round-trip time. The first base station may start a timer to perform timing of the first periodicity. When the timer starts, the first periodicity starts timing. When the timer ends, the first periodicity ends.

In step 304, the first base station determines a minimum first round-trip time reference value based on the N pieces of first round-trip time.

After the first base station obtains the N pieces of first round-trip time by calculation, the first base station determines the minimum first round-trip time reference value based on the N pieces of first round-trip time. The minimum first round-trip time reference value indicates a smallest value of the N pieces of first round-trip time.

In a process of exchanging detection packets between the first base station and the second base station, if a packet exchange frequency is fixed, longer time of the first periodicity indicates more pieces of obtained first round-trip time. Therefore, a minimum round-trip time reference value is closer to an inherent delay of a transmission network.

For example, there are the N pieces of first round-trip time (RTT): $RTT_1, RTT_2, RTT_3, RTT_4, \ldots,$ and $RTT_N$ in the first periodicity. In this way, the smallest value of the N pieces of first round-trip time is $RTT_{min} = \min(RTT_1, RTT_2, RTT_3, RTT_4, \ldots, RTT_N)$. Time information of the first detection packet and the second detection packet of a time corresponding to $RTT_{min}$ between the first base station and the second base station is $RTT_{min}$ ($t_1, t_2, t_3, t_4$).

In step 305, the first base station determines an inter-site synchronization offset value of the first periodicity based on the minimum first round-trip time reference value.

After obtaining the minimum first round-trip time reference value, the first base station determines the inter-site synchronization offset value of the first periodicity based on the minimum first round-trip time reference value. The inter-site synchronization offset value of the first periodicity is an inter-site synchronization offset value that exists when the first base station and the second base station transmit packets through the Xn/X2 interface.

In a possible implementation, the first base station performs calculation based on time information of the first detection packet and the second detection packet of a time corresponding to the minimum first round-trip time reference value between the first base station and the second base station, to obtain the inter-site synchronization offset value of the first periodicity.

For example, if the time information of the exchange of the first detection packet and the second detection packet of the time corresponding to the minimum first round-trip time reference value $RTT_{min}$ between the first base station and the second base station is $RTT_{min}$ ($t_{1min}, t_{2min}, t_{3min}, t_{4min}$), calculation may be performed according to the following formula:

$$\text{Offset} = t_{2min} - t_{1min} - (t_{2min} - t_{1min} + t_{4min} - t_{3min})/2; \text{ and}$$

$$\text{Offset} = t_{2min} - t_{1min} - RTT_{min}/2.$$

Offset represents the inter-site synchronization offset value of the first periodicity, $t_{2min}$ represents first receiving time corresponding to the minimum first round-trip time reference, $t_{1min}$ represents first sending time corresponding to the minimum first round-trip time reference, $RTT_{min}$ represents the minimum first round-trip time reference, and "/" represents a division operator.

In this embodiment of this application, the first base station obtains the N pieces of first round-trip time in the first periodicity, determines the minimum first round-trip time reference value based on the N pieces of first round-trip time, and then determines the inter-site synchronization offset value of the first periodicity based on the minimum first round-trip time reference value. Because a plurality of first round-trip time is obtained in the first periodicity and a smallest value of the first round-trip time is obtained as a parameter for calculating the inter-site synchronization offset value, the first round-trip time is close to inherent duration of the transmission network, and therefore has less impact on calculation of the inter-site synchronization offset value.

In step 306, the first base station obtains M pieces of round-trip time in a second periodicity.

In an actual application process, to ensure that more first round-trip time is obtained, the first periodicity is usually set to one hour or more than one day. Therefore, real-time performance of calculating the inter-site synchronization offset value is affected. Therefore, in this embodiment of this application, the inter-site synchronization offset value may be calculated in real time by starting the second periodicity with a short time interval in the first periodicity.

The first base station starts a timer for the second periodicity, and obtains the M pieces of round-trip time in the second periodicity. M is a positive integer less than N. The second periodicity is also less than the first periodicity.

Specifically, in a possible implementation, N is an integer multiple of M, the first periodicity is also an integer multiple of the second periodicity, and the second periodicity may be set at a granularity of a minute level or a 10-minute level. Start time of the timer for the second periodicity may be the same as start time of the timer for the first periodicity, or the second periodicity may be started after the timer of the first periodicity ends. This is not specifically limited herein.

When the start time of the timer for the second periodicity is the same as the start time of the timer for the first periodicity, the first base station may obtain the M pieces of round-trip time in the second periodicity based on detection packets exchanged with the second base station.

In step 307, the first base station determines a minimum first round-trip time real-time value based on the M pieces of round-trip time.

After the first base station obtains the M pieces of round-trip time in the second periodicity, the first base station determines the minimum first round-trip time real-time value based on the M pieces of round-trip time. The minimum first round-trip time real-time value is a smallest value of the M pieces of round-trip time.

In this embodiment of this application, a method step of obtaining the first round-trip time in the second periodicity is similar to a method step of obtaining the first round-trip time in the first periodicity. Details are not described herein again.

In step 308, an inter-site synchronization offset value of the second periodicity is determined based on the minimum first round-trip time real-time value if a difference between the minimum first round-trip time real-time value and the minimum first round-trip time reference value is less than a preset threshold.

After the first base station determines the minimum first round-trip time real-time value based on the M pieces of round-trip time, if the difference between the minimum first round-trip time real-time value and the minimum first round-trip time reference value is less than the preset threshold, the first base station determines the inter-site synchronization offset value of the second periodicity based on the minimum first round-trip time real-time value. If the difference between the minimum first round-trip time real-time value and the minimum first round-trip time reference value is greater than the preset threshold, it indicates that the second periodicity may be in a delay fluctuation period of the transmission network. Therefore, the minimum first round-trip time real-time value cannot be used to calculate the inter-site synchronization offset value of the second periodicity.

Specifically, when the start time of the timer for the second periodicity is the same as the start time of the timer for the first periodicity, the first base station has not obtained a first round-trip time reference value at an end moment of the timer for the second periodicity, and cannot calculate the difference between the minimum first round-trip time real-time value and the minimum first round-trip time reference value. Therefore, it is temporarily not applicable to calculate the inter-site synchronization offset value of the second periodicity based on the minimum first round-trip time real-time value. In this case, the first base station stores the minimum first round-trip time real-time value locally.

In an actual application process, the first periodicity may be an integer multiple of the second periodicity. Therefore, when the first periodicity ends, the first base station obtains and stores a plurality of minimum first round-trip time real-time values. In a possible implementation, the first base station may separately calculate a plurality of differences at an end moment of the first periodicity based on the stored plurality of minimum first round-trip time real-time values and the minimum first round-trip time reference value, and determine, based on the plurality of differences, whether to calculate an inter-site synchronization offset value of a corresponding second periodicity.

In a possible implementation, the first base station does not calculate inter-site synchronization offset values of a plurality of second periodicities within the first periodicity at the end moment of the first periodicity.

Figure 4:
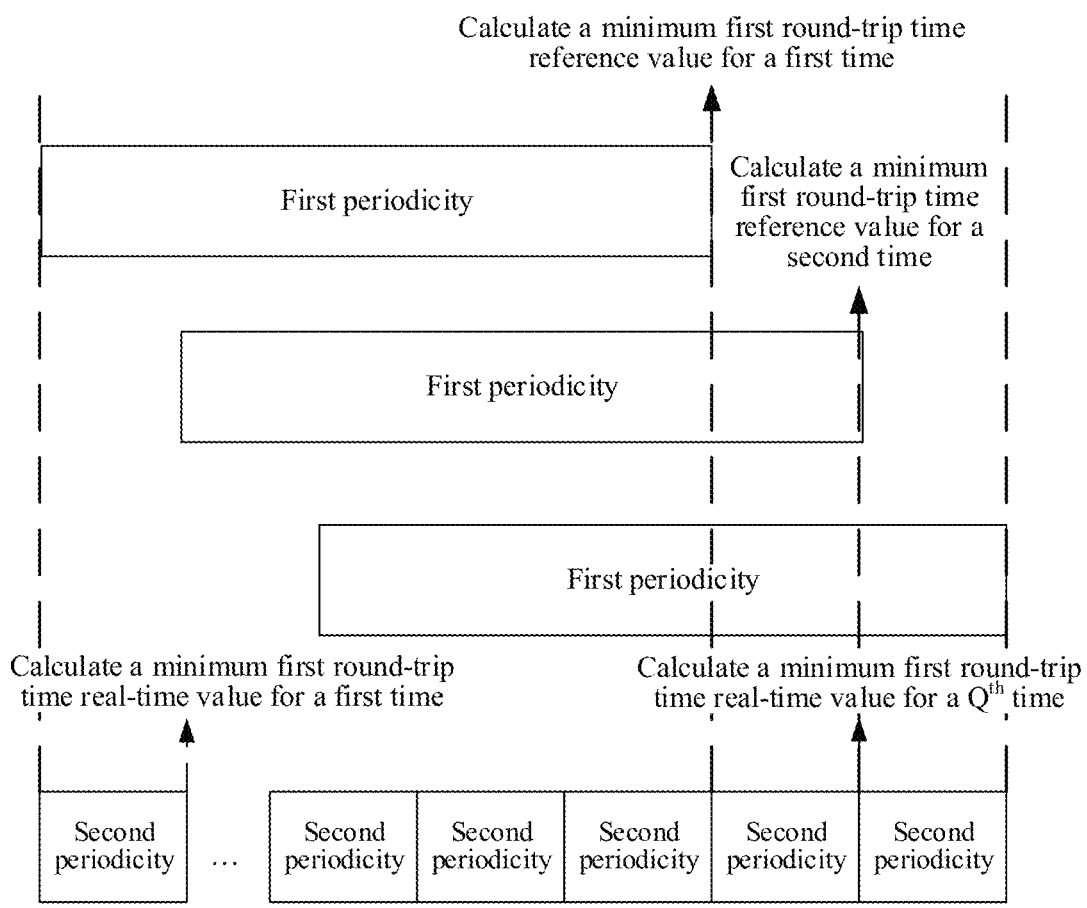
FIG. 4 is another schematic flowchart of a data processing method according to an embodiment of this application.

In a possible implementation, as shown in FIG. 4, after a Pt second periodicity ends, a minimum first round-trip time real-time value is calculated for the first time, and a $2^{nd}$ first periodicity and a $2^{nd}$ second periodicity continue to be started at the same time. After a $1^{st}$ first periodicity ends, a minimum first round-trip time reference value is calculated for the first time, and a $Q^{th}$ second periodicity is started. At an end moment of the $Q^{th}$ second periodicity, because a first periodicity is an integer multiple of a second periodicity, the end moment of the $Q^{th}$ second periodicity is also an end moment of the $2^{nd}$ first periodicity. Therefore, it may be determined whether a minimum first round-trip time real-time value of the $Q^{th}$ second periodicity is less than the minimum first round-trip time reference value of the $1^{st}$ first periodicity. If the minimum first round-trip time real-time value of the $Q^{th}$ second periodicity is less than the minimum first round-trip time reference value of the first periodicity, the minimum first round-trip time reference value is updated. Preferably, after the $Q^{th}$ second periodicity ends and a $Q^{th}$ minimum first round-trip time real-time value is obtained through calculation, a $1^{st}$ minimum first round-trip time real-time value stored in a first base station is deleted, and so on. Subsequently, after a minimum first round-trip time real-time value of each second periodicity is calculated at an end moment of the second periodicity, an earliest minimum first round-trip time real-time value stored in the first base station is deleted.

In this embodiment of this application, the second periodicity is started, and an inter-site synchronization offset measurement value of the second periodicity is obtained through calculation based on the minimum first round-trip time real-time value of the second periodicity. Compared with a solution using the first periodicity with a longer time granularity, this solution can calculate the inter-site synchronization offset measurement value in a shorter time period, and therefore, improve time validity of this solution.

Notably, when an Xn/X2 propagation path of the first base station and a second base station change, first round-trip time real-time values and first round-trip time reference values in the first base station need to be cleared, and calculation of a first round-trip time real-time value and the first round-trip time reference value is restarted.

In step 309, the first base station obtains an air interface offset measurement value.

When an inter-site offset value of the first base station and the second base station is calculated through an Xn/X2 interface, because sometimes transmission paths of the first base station and the second base station are asymmetric or there is a problem of symmetry of receiving and sending optical fibers, a millisecond-level measurement error is caused. A value of the measurement error is fixed. Therefore, the measurement error is a static error. In this embodiment of this application, the static error may be further reduced as much as possible in a manner of air interface measurement.

The first base station and the second base station obtain the air interface offset measurement value in a manner of air interface transmission.

Figure 5:
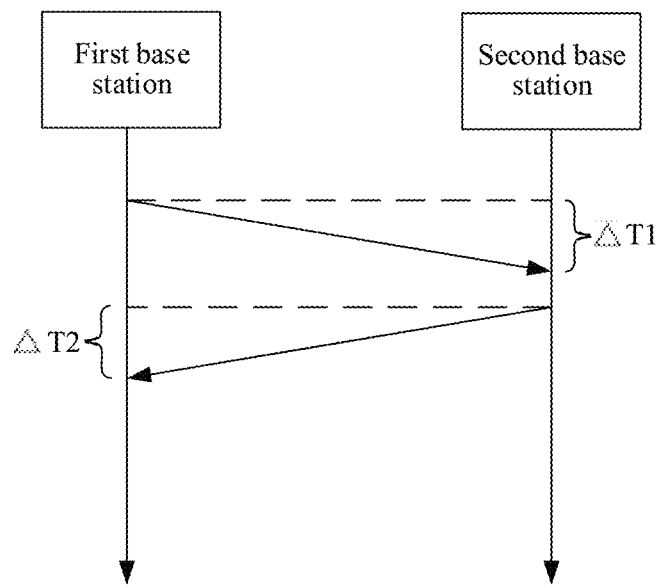
FIG. 5 is another schematic flowchart of a data processing method according to an embodiment of this application.

In a possible implementation, as shown in FIG. 5, an air interface offset measurement value may be obtained by transmitting a detection signal between a first base station and a second base station. Specifically, the first base station sends a first inter-site detection signal to the second base station. The first inter-site detection signal may be a standard signal such as a synchronization signal block (SSB) or a channel state information reference signal (CSI-RS), or may be a special signal defined on an idle symbol (for example, a GP symbol) on a time domain resource. This is not specifically limited herein. The first base station includes, in the first inter-site detection signal, first time information of sending the first inter-site detection signal. After receiving the first inter-site detection signal, the second base station records second time information of receiving the first inter-site detection signal, and sends a second inter-site detection signal to the first base station. The second inter-site detection signal carries third time information of sending the second inter-site detection signal and the second time information of receiving the first inter-site detection signal. After receiving the second detection signal, the first base station records fourth time information of receiving the second detection signal, calculates a first delay $\Delta T1$ based on the first time information and the second time information, and calculates a second delay $\Delta T2$ based on the third time information and the fourth time information. Then, an air interface propagation delay of the first base station and the second base station is calculated in the following manner:

Air interface propagation delay=$(\Delta T1+\Delta T2)/2$, where $\Delta T1$ represents the first delay, $\Delta T2$ represents the second delay, and "/" represents a division operator.

The air interface offset measurement value of the first base station and the second base station is calculated in the following manner:

Air interface offset measurement value=$(\Delta T1-\Delta T2)/2$, where $\Delta T1$ represents the first delay, $\Delta T2$ represents the second delay, and "/" represents a division operator.

Figure 6:
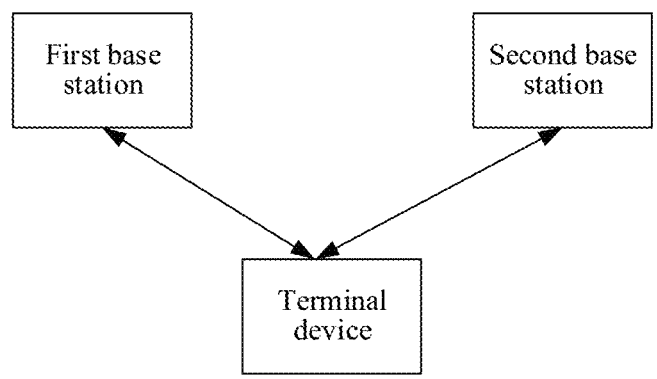
FIG. 6 is a diagram of an application scenario of a data processing method according to an embodiment of this application.

In a possible implementation, as shown in FIG. 6, a first base station and a second base station may perform inter-site air interface offset measurement through a handover terminal device UE between the first base station and the second base station or UE at a cell edge between the first base station and the second base station. The terminal device UE performing handover between the first base station and the second base station may send a detection signal when performing a handover service, to assist the first base station and the second base station in collecting time difference information. The UE at the cell edge between the first base station and the second base station sends a detection signal by performing random access, to assist the first base station and the second base station in collecting the time difference information.

For example, the UE separately sends a detection signal, such as a random access signal, to the first base station and the second base station. The first base station and the second base station perform detection at the same time. A moment when the first base station receives the detection signal is T1, a moment when the second base station receives the detection signal is T2, a propagation delay of sending, by the UE, a detection signal to the first base station is Tp1, and a propagation delay from the UE to the second base station is Tp2. In this case, air interface offset measurement value= $((T1-T2)-(Tp1-Tp2)/2$.

In step 310, the first base station determines a static error value based on the air interface offset measurement value and an inter-site synchronization offset value of a first periodicity.

After the first base station obtains the air interface offset measurement value, the first base station determines a static error of the inter-site synchronization offset value of the first periodicity based on the air interface offset measurement value and the inter-site synchronization offset value of the first periodicity.

Specifically, in an actual application process, inter-site synchronization offset value of the first periodicity=Actual synchronization offset value+Static error value+First dynamic error. Air interface offset measurement value=Actual synchronization offset value+Second dynamic error. A value of the first dynamic error of the inter-site synchronization offset value of the first periodicity is reduced to be less than a preset threshold in a manner of obtaining a minimum first round-trip time in the foregoing step, and therefore may be ignored herein. A value of the second dynamic error may also be ignored because the value is minor. Therefore, the static error=inter-site synchronization offset value of the first periodicity−Air interface offset measurement value. For a fixed Xn/X2 propagation path, the static error is fixed. Therefore, the static error does not need to be calculated in real time. When the Xn/X2 propagation path changes, the static error needs to be recalculated. After the static error value is calculated, the first base station stores the static error value.

In step 311, the first base station compensates the inter-site synchronization offset value of the first periodicity based on the static error value, to obtain a target inter-site synchronization offset value.

After obtaining the static error value, the first base station compensates the inter-site synchronization offset value of the first periodicity based on the static error value, to obtain the target inter-site synchronization offset value.

Specifically, the target inter-site synchronization offset value may be obtained through calculation in the following manner:

Target inter-site synchronization offset value=Inter-site synchronization offset value of the first periodicity−Static error.

Notably, the first base station may adjust a synchronization status of a clock based on the target inter-site synchronization offset value, or may adjust the synchronization status of the clock based on the air interface offset measurement value, or adjust the synchronization status of the clock based on an average value of the target inter-site synchronization offset value and the air interface offset measurement value. This is not specifically limited herein.

In an actual application process, the first base station and the second base station possibly cannot perform air interface offset measurement at some moments due to a limitation of a condition of air interface transmission. For example, a signal-to-noise ratio of an air interface is large, or there is no handover UE or no edge UE. In this case, if the static error value is previously stored in the first base station, the first base station may compensate the inter-site synchronization offset value of the first periodicity based on the stored static error value, to obtain the target inter-site synchronization offset value, and then adjust the synchronization status of the clock based on the target inter-site synchronization offset value. If the first base station does not store the static error value previously, the inter-site synchronization offset value of the first periodicity cannot be compensated. It may be understood that, when transmission paths of the first base station and the second base station remain unchanged, the first base station obtains a new static error. In this case, the new static error and the static error stored in the first base station are averaged, and an average static error is updated to storage of the first base station.

When the inter-site synchronization offset value of the first periodicity cannot be compensated, an offset measurement value change may be obtained based on a difference between the inter-site synchronization offset value of the first periodicity and the inter-site synchronization offset value of a previous first periodicity. Then, it is determined whether the clock has a large offset based on the offset measurement value change. For example, if a clock corresponding to the previous first periodicity is normal, but a clock corresponding to a current first periodicity has an offset, the offset measurement value change is greater than a preset threshold. In this case, it is determined that the clock has a large offset.

Notably, in this embodiment of this application, the first base station and the second base station may alternatively be replaced with devices such as transmission nodes (for example, microwave devices) or time servers that support both the air interface transmission and terrestrial transmission and meet time synchronization. This is not specifically limited herein.

In this embodiment of this application, step 306 to step 311 are optional steps. When step 306 to step 311 are not performed, the first base station adjusts the synchronization status of the clock based on the inter-site synchronization offset value of the first periodicity.

In this embodiment of this application, the first base station obtains N pieces of first round-trip time in the first periodicity, determines a minimum first round-trip time reference value based on the N pieces of first round-trip time, and then determines the inter-site synchronization offset value based on the minimum first round-trip time reference value. This reduces a risk of a large error in an offset measurement result caused by an excessively high delay arising from jitter in the case of burst or congestion.

Figure 7:
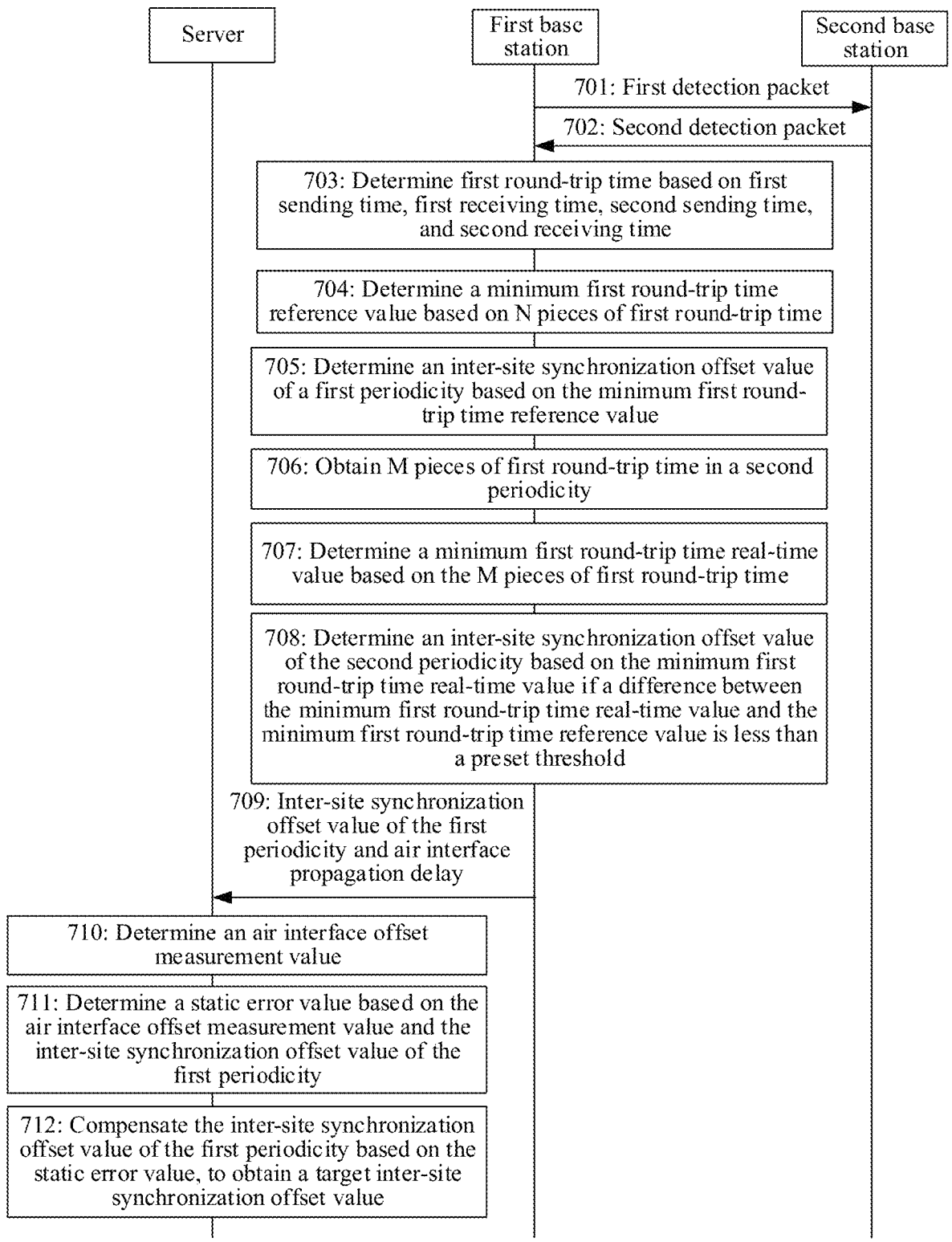
FIG. 7 is another schematic flowchart of a data processing method according to an embodiment of this application.

FIG. 7 is another schematic flowchart of a data processing method according to an embodiment of this application.

In step 701, a first base station sends a first detection packet to a second base station.

In step 702, the first base station receives a second detection packet sent by the second base station.

In step 703, the first base station determines first round-trip time based on first sending time, first receiving time, second sending time, and second receiving time.

In step 704, the first base station determines a minimum first round-trip time reference value based on N pieces of first round-trip time.

In step 705, the first base station determines an inter-site synchronization offset value of a first periodicity based on the minimum first round-trip time reference value.

In step 706, the first base station obtains M pieces of round-trip time in a second periodicity.

In step 707, the first base station determines a minimum first round-trip time real-time value based on the M pieces of round-trip time.

In step 708, an inter-site synchronization offset value of the second periodicity is determined based on the minimum first round-trip time real-time value if a difference between the minimum first round-trip time real-time value and the minimum first round-trip time reference value is less than a preset threshold.

In this embodiment, step 701 to step 708 are similar to the method performed in step 301 to step 308 in the foregoing embodiment shown in FIG. 3, and details are not described herein again.

In step 709, the first base station sends the inter-site synchronization offset value of the first periodicity and an air interface propagation delay to a server.

When an inter-site offset value of the first base station and the second base station is calculated through an Xn/X2 interface, because sometimes transmission paths of the first base station and the second base station are asymmetric or there is a problem of symmetry of receiving and sending optical fibers, a millisecond-level measurement error is caused. A value of the measurement error is fixed. Therefore, the measurement error is a static error. In this embodiment of this application, the static error may be further reduced as much as possible in a manner of air interface measurement.

The first base station and the second base station obtain the air interface propagation delay in a manner of air interface transmission.

In a possible implementation, as shown in FIG. 5, the air interface propagation delay may be obtained by transmitting a detection signal between the first base station and the second base station. Specifically, the first base station sends a first inter-site detection signal to the second base station. The first inter-site detection signal may be a standard signal such as a synchronization signal block (SSB) or a CSI-RS, or may be a special signal defined on an idle symbol (for example, a GP symbol) on a time domain resource. This is not specifically limited herein. The first base station includes, in the first inter-site detection signal, first time information of sending the first inter-site detection signal. After receiving the first inter-site detection signal, the second base station records second time information of receiving the first inter-site detection signal, and sends a second inter-site detection signal to the first base station. The second inter-site detection signal carries third time information of sending the second inter-site detection signal and the second time information of receiving the first inter-site detection signal. After receiving the second detection signal, the first base station records fourth time information of receiving the second detection signal, calculates a first delay $\Delta T1$ based on the first time information and the second time information, and calculates a second delay $\Delta T2$ based on the third time information and the fourth time information. Then, the air interface propagation delay of the first base station and the second base station is calculated in the following manner:

Air interface propagation delay=$(\Delta T1+\Delta T2)/2$, where $\Delta T1$ represents the first delay, $\Delta T2$ represents the second delay, and "/" represents a division operator.

In a possible implementation, as shown in FIG. 6, the first base station and the second base station may obtain the air interface propagation delay by using a handover terminal device UE between the first base station and the second base station or UE at a cell edge between the first base station and the second base station. The terminal device UE performing handover between the first base station and the second base station may send a detection signal when performing a handover service, to assist the first base station and the second base station in collecting time difference information. The UE at the cell edge between the first base station and the second base station sends a detection signal by performing random access, to assist the first base station and the second base station in collecting the time difference information.

For example, the UE separately sends a detection signal, such as a random access signal, to the first base station and the second base station. The first base station and the second base station perform detection at the same time. A moment when the first base station receives the detection signal is T1, a moment when the second base station receives the detection signal is T2, a propagation delay of sending, by the UE, a detection signal to the first base station is Tp1, and a propagation delay from the UE to the second base station is Tp2. In this case, the air interface propagation delay=(Tp1+Tp2)/2.

After the first base station obtains the air interface propagation delay, the first base station sends the air interface propagation delay and the inter-site synchronization offset value of the first periodicity to the server.

In step 710, the server determines an air interface offset measurement value.

After receiving the air interface propagation delay and the inter-site synchronization offset value of the first periodicity sent by the first base station, the server further determines the air interface offset measurement value based on the air interface propagation delay and the inter-site synchronization offset value of the first periodicity. A calculation manner for the air interface offset measurement value is similar to the calculation manner of step 309 in FIG. 3, and details are not described herein again.

In step 711, a static error value is determined based on the air interface offset measurement value and the inter-site synchronization offset value of the first periodicity.

In step 712, the inter-site synchronization offset value of the first periodicity is compensated based on the static error value, to obtain a target inter-site synchronization offset value.

In this embodiment, step 711 to step 712 are similar to the method performed in step 310 to step 311 in the foregoing embodiment shown in FIG. 3, and details are not described herein again.

In this embodiment of this application, the server calculates the target inter-site synchronization offset value. Therefore, the server may serve a plurality of base stations, and adjust a synchronization status of a clock through unified management.

Figure 8:
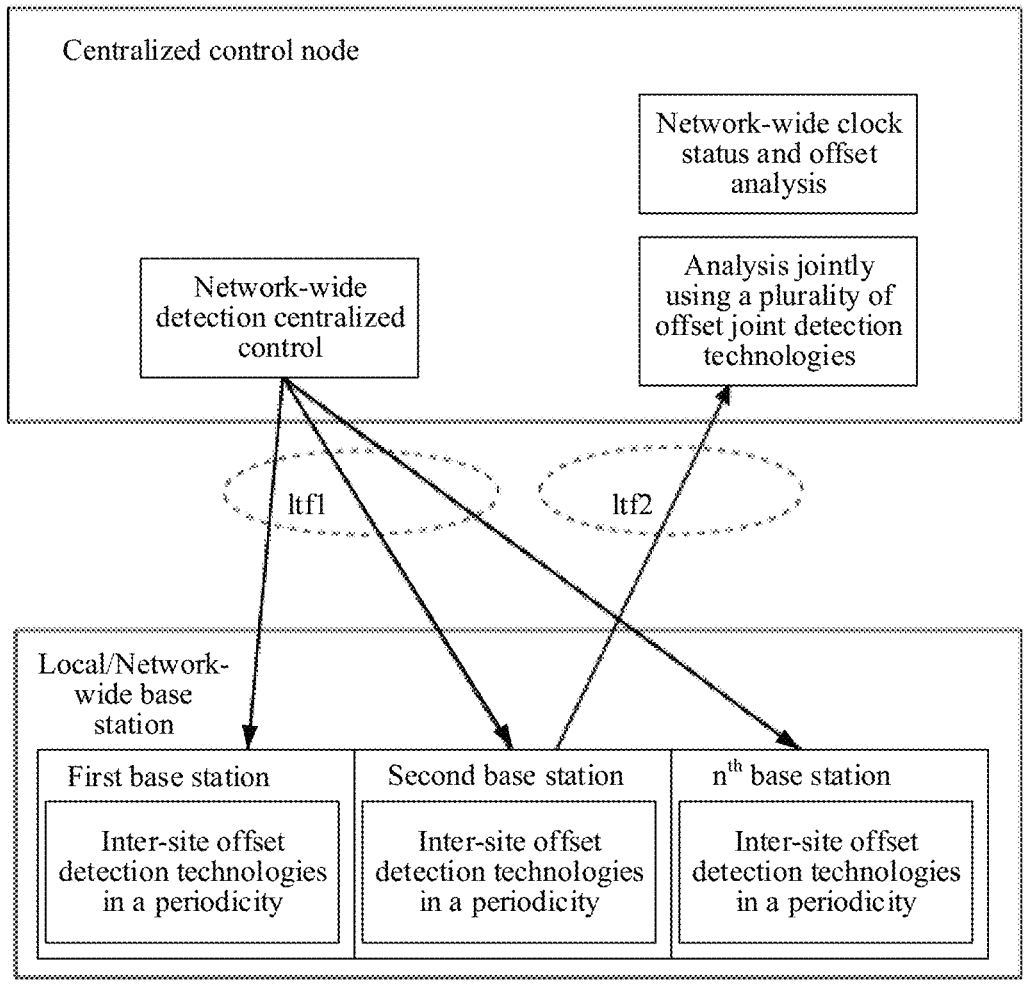
FIG. 8 is another schematic flowchart of a data processing method according to an embodiment of this application.

FIG. 8 is another schematic flowchart of a data processing method according to an embodiment of this application.

In this embodiment, a centralized control node may be deployed on a server, or may be deployed on any base station, or may be deployed on a transmission network. This is not specifically limited herein.

The centralized control node uses a network-wide detection centralized control module to centrally control inter-site offset measurement on an entire network. This ensures consistency and effectiveness of detection on the entire network. The network-wide detection centralized control includes: The centralized control node centrally controls a specified frequency for sending an air interface detection sequence, the air interface detection sequence, an air interface offset measurement and Xn/X2 joint detection periodicity, a start moment, and the like.

The centralized control node sends a command to a local or network-wide base station through a ltf1 interface, and the local or network-wide base station send data to the centralized control node through a ltf2 interface.

In this embodiment, a plurality of offset joint detection technologies executed by the local/network-wide base station and the centralized control node are an offset measurement method based on an Xn/X2 interface and an air interface offset measurement method based on air interface transmission. The offset measurement method based on an Xn/X2 interface and the air interface offset measurement method based on air interface transmission are similar to the offset measurement method based on an Xn/X2 interface and the air interface offset measurement method based on air interface transmission that are executed by the first base station or the server in FIG. 3 or FIG. 7. Details are not described herein again.

The centralized control node performs centralized intelligent analysis (for example, some clustering algorithms may be used) on network-wide inter-site offset data, identifies most normal sites according to a principle that clocks of most sites are normal, and may further identify, by using a normal site as a reference, a few sites with a large offset of a clock (for example, a synchronization offset measurement value between the few sites with a large offset of a clock and a reference site is greater than a preset threshold).

After identifying a status of a clock of the network-wide base station, the centralized control node may comprehensively analyze the status of the clock with a 1588 topology, to quickly determine a fault point of a 1588 clock source. A clock server transmits a clock signal to a base station through a transmission network, and information about the 1588 topology includes: information about the clock server and a previous-hop 1588 device connected to the base station. Alternatively, the information may be information about an each-hop transmission device that the clock server passes through to the base station. This is not specifically limited herein.

For example, if all base stations under a same 1588 clock source are out of synchronization, it is determined that the 1588 clock source is faulty, that is, the clock server is faulty.

For another example, if all base stations under a same 1588 transmission device are out of synchronization, it is determined that the transmission device is faulty.

For another example, if some base stations under a same 1588 transmission device are out of synchronization, and some base stations are not out of synchronization, some ports of the transmission device may be faulty or some base stations may be faulty.

For standard 1588 time synchronization, a hop-by-hop device needs to support a 1588 protocol and compensate for a path asymmetry error. Otherwise, the path asymmetry error causes a large 1588 time synchronization error.

For a recommended 1588 time synchronization solution (for example, 1588 loose time synchronization such as 1588 ATR or FDD handover that has a low requirement on time synchronization precision), an intermediate transmission device does not need to support the 1588 protocol. However, a bidirectional propagation path between the base station and the 1588 clock server needs to be symmetric.

In a current method for compensating path asymmetry, only manual site-by-site measurement by mounting meters is used for compensation. This method has high labor and time costs.

In this embodiment of this application, after the status of the clock of the network-wide base station is identified and the status of the clock of the network-wide base station is comprehensively analyzed with the 1588 topology, a clock faulty site and the reference site may be identified. Then, the path asymmetry error of the 1588 time synchronization is automatically compensated based on an inter-site synchronization offset value measured through the Xn/X2 interface or an air interface. This reduces a deployment requirement and costs of the 1588 time synchronization, and improves precision of the 1588 loose time synchronization.

Specifically, in a 1588 deployment phase, after the status of the clock of the network-wide base station is identified and the status of the clock of the network-wide base station is comprehensively analyzed with the 1588 topology, a site with a large 1588 clock offset is identified. A path asymmetry error of the site with a large 1588 clock offset may be calculated by using a reference neighboring site as a reference. Further, the path asymmetry error of the site with a large 1588 clock offset may be compensated to ensure precision of 1588 v2 time synchronization.

In a 1588 normal running phase, if a transmission path changes causing a path to become asymmetric, quality detection of a network-wide/local clock may also be used to timely detect and automatically recompensate for the asymmetry.

Specifically, in a possible implementation, in each periodicity, the following processing may be performed on a 1588 faulty site:

If in a periodicity, there are measured inter-site synchronization offsets, which are respectively $Offset_1$, $Offset_2$, ..., and $Offset_d$, between the 1588 faulty site and d (d>0) non-faulty reference neighboring sites, a compensation amount for a path asymmetry error of the 1588 faulty site in the periodicity may be calculated in the following manner:

$$\Delta T_{Asy}=1/d^*(Offset_1+Offset_2+\ldots+Offset_d).$$

$\Delta T_{Asy}$ represents a compensation amount for the path asymmetry error in the current periodicity.

After the status of the clock of the network-wide base station is identified and the status of the clock of the network-wide base station is comprehensively analyzed with the 1588 topology, if it is determined that a problem is caused by the base station or it cannot be determined whether the problem is caused by the base station or the transmission device, the compensation amount for the path asymmetry error in the current periodicity is preferentially compensated on a base station side. If the problem is caused by the transmission device, the compensation amount for the path asymmetry error in the current periodicity may be compensated on a base station side, or may be compensated on the transmission device.

If it is determined, after the status of the clock of the network-wide base station is identified and the status of the clock of the network-wide base station is comprehensively analyzed with the 1588 topology, that path asymmetry errors measured for K (K>0) base stations under the transmission device are respectively $\Delta T_{Asy1}$, $\Delta T_{Asy2}$, ..., and $\Delta T_{Asyk}$, a compensation amount for the path asymmetry errors on the transmission device may be calculated in the following manner:

$$\Delta T_{Asy}=1/K^*(\Delta T_{Asy1}+\Delta T_{Asy2}+\ldots+\Delta T_{Asyk}).$$

$\Delta T_{Asy}$ represents the compensation amount for the path asymmetry errors on the transmission device.

It may be understood that the compensation amount for the path asymmetry errors on the transmission device may be calculated in another manner. This is not specifically limited herein.

In a possible implementation, if in a periodicity, there is no measured site synchronization offset between a faulty site and all non-faulty reference neighboring sites, and a path asymmetry error of the faulty site cannot be calculated, the following determining is further performed:

After the status of the clock of the network-wide base station is identified and the status of the clock of the network-wide base station is comprehensively analyzed with the 1588 topology, if the problem is caused by the base station or it cannot be determined whether the problem is caused by the base station or the transmission device, a clock of the faulty site in this periodicity enters a holdover status. If it is determined that the transmission device is faulty, it is advised to perform compensation on the transmission device. As long as the path asymmetry error can be measured on any base station under the transmission device, the compensation can be performed on the transmission device, unless the path asymmetry error cannot be measured on all base stations under the transmission device and all base stations of the 1588 time synchronization under the transmission device enter the holdover status.

Figure 9:
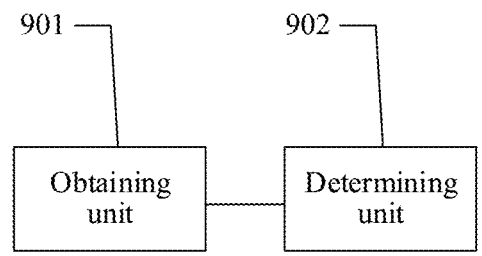
FIG. 9 is a schematic diagram of an architecture of a network device according to an embodiment of this application.

The foregoing describes the data processing method in embodiments of this application. The following describes a network device in embodiments of this application. FIG. 9 is a schematic diagram of a structure of an embodiment of a network device according to this application.

The network device includes:

an obtaining unit 901, configured to obtain N pieces of first round-trip time in a first periodicity, where the first round-trip time is time consumed when a first network device and a second network device each transmit a packet once through an Xn/X2 interface, and N is a positive integer greater than 1; and a determining unit 902, configured to determine a minimum first round-trip time reference value based on the N pieces of first round-trip time, where the minimum first round-trip time reference value is a smallest value of the N pieces of first round-trip time.

The determining unit 902 is further configured to determine an inter-site synchronization offset value of the first periodicity based on the minimum first round-trip time reference value. The inter-site synchronization offset value of the first periodicity is an inter-site synchronization offset value that exists when the first network device and the second network device transmit packets through the Xn/X2 interface.

In this embodiment, operations performed by units of the network device are similar to that in the method performed by the first base station described in the embodiment shown in FIG. 3 or FIG. 7, and details are not described herein again.

Figure 10:
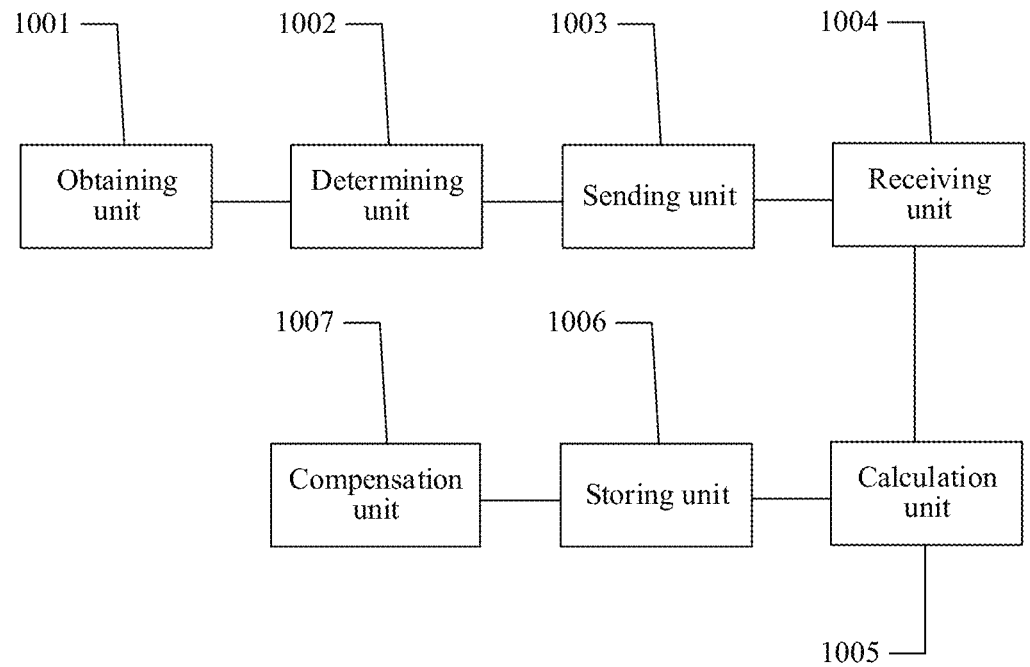
FIG. 10 is a schematic diagram of another architecture of a network device according to an embodiment of this application.

FIG. 10 is a schematic diagram of a structure of another embodiment of a network device according to this application.

The network device includes:
- an obtaining unit 1001, configured to obtain N pieces of first round-trip time in a first periodicity, where the first round-trip time is time consumed when a first network device and a second network device each transmit a packet once through an Xn/X2 interface, and N is a positive integer greater than 1; and
- a determining unit 1002, configured to determine a minimum first round-trip time reference value based on the N pieces of first round-trip time, where the minimum first round-trip time reference value is a smallest value of the N pieces of first round-trip time.

The determining unit 1002 is further configured to determine an inter-site synchronization offset value of the first periodicity based on the minimum first round-trip time reference value. The inter-site synchronization offset value of the first periodicity is an inter-site synchronization offset value that exists when the first network device and the second network device transmit packets through the Xn/X2 interface.

Optionally, the network device further includes:
- a sending unit 1003, configured to send a first detection packet to the second network device in step 1, where the first detection packet carries first sending time, and the first sending time is time at which the first network device sends the first detection packet to the second network device; and
- a receiving unit 1004, configured to receive a second detection packet sent by the second network device in step 2, where the second detection packet carries first receiving time and second sending time, the first receiving time is time at which the second network device receives the first detection packet, and the second sending time is time at which the second network device sends the second detection packet.

Step 3: The determining unit 1002 is further configured to determine second receiving time. The second receiving time is time at which the first network device receives the second detection packet.

Step 4: The determining unit 1002 is further configured to determine the first round-trip time based on the first sending time, the first receiving time, the second sending time, and the second receiving time.

The network device performs step 1 to step 4 for N times in the first periodicity, to obtain the N pieces of first round-trip time.

Optionally, the network device further includes:
- a calculation unit 1005, configured to perform calculation in the following manner:

$$RTT = t_2 - t_1 + t_4 - t_3.$$

RTT represents the first round-trip time, $t_2$ represents the first receiving time, $t_1$ represents the first sending time, $t_4$ represents the second receiving time, and $t_3$ represents the second sending time.

Optionally, the calculation unit 1005 is further configured to perform calculation in the following manner:

$$\text{Offset} = t_{2min} - t_{1min} - RTT_{min}/2.$$

Offset represents the inter-site synchronization offset value of the first periodicity, $t_{2min}$ represents first receiving time corresponding to the minimum first round-trip time reference, $t_{1min}$ represents first sending time corresponding to the minimum first round-trip time reference, and $RTT_{min}$ represents the minimum first round-trip time reference.

Optionally, the obtaining unit 1001 is further configured to obtain M pieces of round-trip time in a second periodicity. M is less than N. The second periodicity is less than the first periodicity.

The determining unit 1002 is further configured to determine a minimum first round-trip time real-time value based on the M pieces of round-trip time. The minimum first round-trip time real-time value is a smallest value of the M pieces of round-trip time.

The determining unit 1002 is further configured to determine an inter-site synchronization offset value of the second periodicity based on the minimum first round-trip time real-time value if a difference between the minimum first round-trip time real-time value and the minimum first round-trip time reference value is less than a preset threshold.

Optionally, the obtaining unit 1002 is further configured to obtain an air interface offset measurement value. The air interface offset measurement value is a synchronization offset value that exists when the first network device and the second network device transmit packets through an air interface.

The determining unit 1002 is further configured to determine a static error value based on the air interface offset measurement value and the inter-site synchronization offset value of the first periodicity. The static error value is a fixed value of a delay offset that exists when the first network device and the second network device transmit packets.

The network device further includes:
- a storing unit 1006, configured to store the static error value.

Optionally, the network device further includes:
- a compensation unit 1007, configured to compensate the inter-site synchronization offset value of the first periodicity based on the static error value, to obtain a target inter-site synchronization offset value.

In this embodiment, operations performed by units of the network device are similar to that in the method performed by the first base station described in the embodiment shown in FIG. 3 or FIG. 7, and details are not described herein again.

Figure 11:
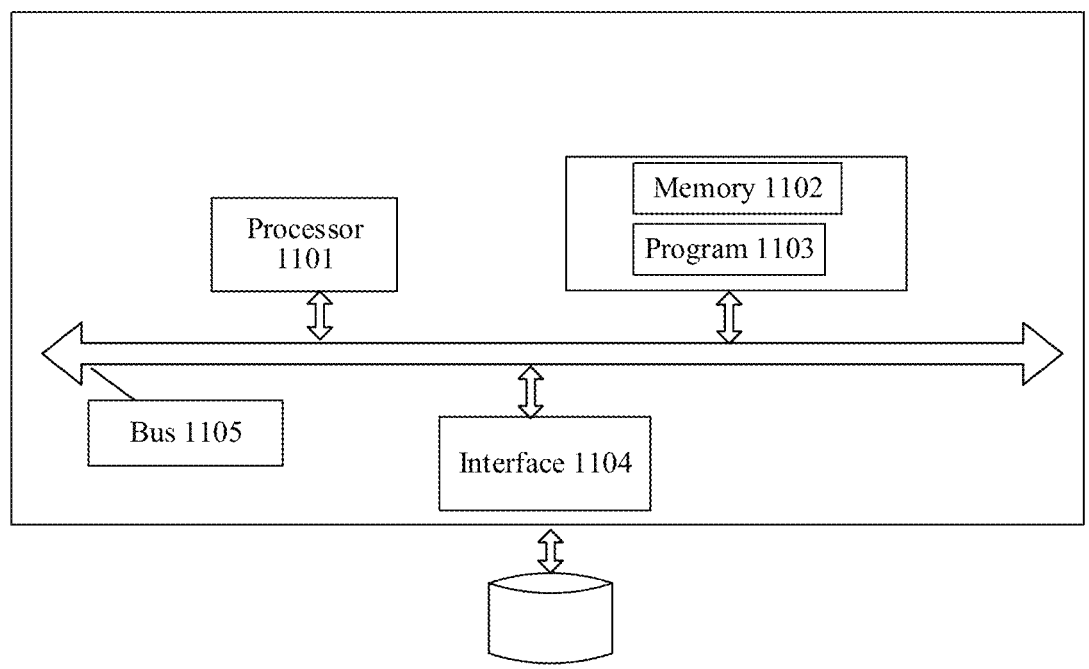
FIG. 11 is a schematic diagram of another architecture of a network device according to an embodiment of this application.

FIG. 11 is a schematic diagram of a structure of another embodiment of a network device according to this application.

The network device includes devices such as a processor 1101, a memory 1102, a bus 1105, and an interface 1104. The processor 1101 is connected to the memory 1102 and the interface 1104. The bus 1105 is separately connected to the processor 1101, the memory 1102, and the interface 1104. The interface 1104 is configured to receive or send data. The processor 1101 is a single-core or multi-core central processing unit, or an application-specific integrated circuit, or one or more integrated circuits configured to implement this embodiment of the present invention. The memory 1102 may be a random access memory (RAM), or may be a non-volatile memory, for example, at least one hard disk memory. The memory 1102 is configured to store computer-executable instructions. Specifically, the computer-executable instructions may include a program 1103.

In this embodiment, the processor 1101 may perform the operations performed by the network device in the embodiment shown in FIG. 3 or FIG. 7. Details are not described herein again.

It can be understood that the processor mentioned in the foregoing embodiments of this application, or the processor provided in the foregoing embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It can be further understood that there may be one or more processors in the foregoing embodiments of this application. This may be adjusted based on an actual application scenario. This is merely an example for description herein, and is not limited. There may be one or more memories in embodiments of this application. This may be adjusted based on an actual application scenario. This is merely an example for description herein, and is not limited.

Notably, when the network device, the terminal device, or the base station includes a processor (or a processing unit) and a storage unit, the processor in this application may be integrated with the storage unit, or the processor may be connected to the storage unit through an interface. This may be adjusted based on an actual application scenario, and is not limited.

The processor in this embodiment of this application may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

An embodiment of this application further provides a computer program or a computer program product including the computer program. When the computer program is executed on a computer, the computer is enabled to implement the method procedure performed by the terminal device/network device/base station in any one of the foregoing method embodiments.

An embodiment of this application further provides a computer-readable storage medium. The computer-readable storage medium stores a computer program. When the computer program is executed by a computer, a method procedure related to the network device, the terminal device, or the base station in any one of the foregoing method embodiments is implemented.

All or some of the foregoing embodiments in FIG. 2 to FIG. 8 may be implemented by using software, hardware, firmware, or any combination thereof. When software is used to implement the embodiments, a part or all of the embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid-State Disk (SSD)), or the like.

In the specification, claims, and accompanying drawings of this application, the terms "first", "second", and so on are intended to distinguish between similar objects but do not necessarily indicate a specific order or sequence. It can be understood that the terms used in such a way are interchangeable in proper circumstances, which is merely a distinguishing manner that is used when objects having a same attribute are described in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

In the several embodiments provided in this application, it can be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

The terms used in embodiments of this application are merely for the purpose of illustrating specific embodiments, and are not intended to limit the present invention. Terms "a", "the", and "this" of singular forms used in embodiments of this application are also intended to include plural forms, unless otherwise specified in a context clearly. It can be further understood that, in the descriptions of this application, "/" represents an "or" relationship between associated objects, unless otherwise specified. For example, AB may represent A or B. A term "and/or" in this application is merely an association relationship between associated objects, and represents that three relationships may exist. For example, A and/or B may represent the following three cases: Only A exists, both A and B exist, and only B exists, where A and B each may be singular or plural.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application.

What is claimed is:

1. A data processing method, comprising:
    obtaining, by a first network device, N pieces of first round-trip time in a first periodicity, wherein the first round-trip time is time consumed when the first network device and a second network device each transmit a packet once through an Xn/X2 interface, and N is a positive integer greater than 1;
    determining, by the first network device, a minimum first round-trip time reference value based on the N pieces of first round-trip time, wherein the minimum first round-trip time reference value is a smallest value of the N pieces of first round-trip time; and
    determining, by the first network device, an inter-site synchronization offset value of the first periodicity based on the minimum first round-trip time reference value, wherein the inter-site synchronization offset value of the first periodicity is an inter-site synchronization offset value that exists when the first network device and the second network device transmit packets through the Xn/X2 interface.

2. The data processing method according to claim 1, wherein the obtaining, by a first network device, N pieces of first round-trip time in a first periodicity comprises:
    (1): sending, by the first network device, a first detection packet to the second network device, wherein the first detection packet carries first sending time, and the first sending time is a time at which the first network device sends the first detection packet to the second network device;
    (2): receiving, by the first network device, a second detection packet sent by the second network device, wherein the second detection packet carries first receiving time and second sending time, the first receiving time is a time at which the second network device receives the first detection packet, and the second sending time is a time at which the second network device sends the second detection packet;
    (3): determining, by the first network device, second receiving time, wherein the second receiving time is a time at which the first network device receives the second detection packet;
    (4): determining, by the first network device, the first round-trip time based on the first sending time, the first receiving time, the second sending time, and the second receiving time; and
    performing, by the first network device, (1) to (4) for N times in the first periodicity, to obtain the N pieces of first round-trip time.

3. The data processing method according to claim 2, wherein the determining, by the first network device, the first round-trip time based on the first sending time, the first receiving time, the second sending time, and the second receiving time comprises:

$RTT = t_2 - t_1 + t_4 - t_3$, wherein:

RTT represents the first round-trip time, $t_2$ represents the first receiving time, $t_1$ represents the first sending time, $t_4$ represents the second receiving time, and $t_3$ represents the second sending time.

4. The data processing method according to claim 2, wherein the determining, by the first network device, an inter-site synchronization offset value of the first periodicity based on the minimum first round-trip time reference value comprises:

$Offset = t_{2min} - t_{1min} - RTT_{min}/2$, wherein:

Offset represents the inter-site synchronization offset value of the first periodicity, $t_{2min}$ represents first receiving time corresponding to the minimum first round-trip time reference value, $t_{1min}$ represents first sending time corresponding to the minimum first round-trip time reference value, and $RTT_{min}$ represents the minimum first round-trip time reference value.

5. The data processing method according to claim 1, wherein the method further comprises:
    obtaining, by the first network device, M pieces of round-trip time in a second periodicity, wherein M is less than N, and the second periodicity is less than the first periodicity;
    determining, by the first network device, a minimum first round-trip time real-time value based on the M pieces of round-trip time, wherein the minimum first round-trip time real-time value is a smallest value of the M pieces of round-trip time; and
    determining, by the first network device, an inter-site synchronization offset value of the second periodicity based on the minimum first round-trip time real-time value, wherein a difference between the minimum first round-trip time real-time value and the minimum first round-trip time reference value is less than a preset threshold.

6. The data processing method according to claim 1, wherein the method further comprises:
    obtaining, by the first network device, an air interface offset measurement value, wherein the air interface offset measurement value is a synchronization offset value that exists when the first network device and the second network device transmit packets through an air interface;
    determining, by the first network device, a static error value based on the air interface offset measurement value and the inter-site synchronization offset value of the first periodicity, wherein the static error value is a fixed value of a delay offset that exists when the first network device and the second network device transmit packets; and
    storing, by the first network device, the static error value.

7. The data processing method according to claim 6, wherein after the determining, by the first network device, a static error value based on the air interface offset measurement value and the inter-site synchronization offset value of the first periodicity, the method further comprises:
compensating, by the first network device, the inter-site synchronization offset value of the first periodicity based on the static error value, to obtain a target inter-site synchronization offset value.

8. A network device, comprising:
one or more processors; and
one or more memories coupled to the one or more processors and storing programming instructions for execution by the one or more processors to cause the network device to perform operations comprising:
obtaining N pieces of first round-trip time in a first periodicity, wherein the first round-trip time is time consumed when a first network device and a second network device each transmit a packet once through an Xn/X2 interface, and N is a positive integer greater than 1;
determining a minimum first round-trip time reference value based on the N pieces of first round-trip time, wherein the minimum first round-trip time reference value is a smallest value of the N pieces of first round-trip time; and
determining an inter-site synchronization offset value of the first periodicity based on the minimum first round-trip time reference value, wherein the inter-site synchronization offset value of the first periodicity is an inter-site synchronization offset value that exists when the first network device and the second network device transmit packets through the Xn/X2 interface.

9. The network device according to claim 8, wherein the operations further comprise:
(1): sending a first detection packet to the second network device, wherein the first detection packet carries first sending time, and the first sending time is a time at which the first network device sends the first detection packet to the second network device; and
(2): receiving a second detection packet sent by the second network device, wherein the second detection packet carries first receiving time and second sending time, the first receiving time is a time at which the second network device receives the first detection packet, and the second sending time is a time at which the second network device sends the second detection packet, wherein
(3): determining second receiving time, wherein the second receiving time is a time at which the first network device receives the second detection packet;
(4): determining the first round-trip time based on the first sending time, the first receiving time, the second sending time, and the second receiving time; and
performing (1) to (4) for N times in the first periodicity, to obtain the N pieces of first round-trip time.

10. The network device according to claim 9, wherein the determining the first round-trip time based on the first sending time, the first receiving time, the second sending time, and the second receiving time comprises:

$RTT = t_2 - t_1 + t_4 - t_3$, wherein:

RTT represents the first round-trip time, $t_2$ represents the first receiving time, $t_1$ represents the first sending time, $t_4$ represents the second receiving time, and $t_3$ represents the second sending time.

11. The network device according to claim 9, wherein the determining an inter-site synchronization offset value of the first periodicity based on the minimum first round-trip time reference value comprises:

$Offset = t_{2min} - t_{1min} - RTT_{min}/2$, wherein:

Offset represents the inter-site synchronization offset value of the first periodicity, $t_{2min}$ represents first receiving time corresponding to the minimum first round-trip time reference value, $t_{1min}$ represents first sending time corresponding to the minimum first round-trip time reference value, and $RTT_{min}$ represents the minimum first round-trip time reference value.

12. The network device according to claim 8, wherein the operations further comprise:
obtaining M pieces of round-trip time in a second periodicity, wherein M is less than N, and the second periodicity is less than the first periodicity;
determining a minimum first round-trip time real-time value based on the M pieces of round-trip time, wherein the minimum first round-trip time real-time value is a smallest value of the M pieces of round-trip time; and
determining an inter-site synchronization offset value of the second periodicity based on the minimum first round-trip time real-time value, wherein a difference between the minimum first round-trip time real-time value and the minimum first round-trip time reference value is less than a preset threshold.

13. The network device according to claim 8, wherein the operations further comprise:
obtaining an air interface offset measurement value, wherein the air interface offset measurement value is a synchronization offset value that exists when the first network device and the second network device transmit packets through an air interface;
determining a static error value based on the air interface offset measurement value and the inter-site synchronization offset value of the first periodicity, wherein the static error value is a fixed value of a delay offset that exists when the first network device and the second network device transmit packets; and
storing the static error value.

14. The network device according to claim 13, wherein the operations further comprise:
after determining the static error value based on the air interface offset measurement value and the inter-site synchronization offset value of the first periodicity, compensating the inter-site synchronization offset value of the first periodicity based on the static error value, to obtain a target inter-site synchronization offset value.

15. A non-transitory computer-readable medium storing one or more instructions executable by a computer system to perform operations comprising:
obtaining, by a first network device, N pieces of first round-trip time in a first periodicity, wherein the first round-trip time is time consumed when the first network device and a second network device each transmit a packet once through an Xn/X2 interface, and N is a positive integer greater than 1;
determining, by the first network device, a minimum first round-trip time reference value based on the N pieces of first round-trip time, wherein the minimum first round-trip time reference value is a smallest value of the N pieces of first round-trip time; and
determining, by the first network device, an inter-site synchronization offset value of the first periodicity based on the minimum first round-trip time reference value, wherein the inter-site synchronization offset value of the first periodicity is an inter-site synchronization offset value that exists when the first network device and the second network device transmit packets through the Xn/X2 interface.

16. The non-transitory computer-readable medium according to claim 15, wherein the obtaining, by a first network device, N pieces of first round-trip time in a first periodicity comprises:
(1): sending, by the first network device, a first detection packet to the second network device, wherein the first detection packet carries first sending time, and the first sending time is a time at which the first network device sends the first detection packet to the second network device;
(2): receiving, by the first network device, a second detection packet sent by the second network device, wherein the second detection packet carries first receiving time and second sending time, the first receiving time is a time at which the second network device receives the first detection packet, and the second sending time is a time at which the second network device sends the second detection packet;
(3): determining, by the first network device, second receiving time, wherein the second receiving time is a time at which the first network device receives the second detection packet;
(4): determining, by the first network device, the first round-trip time based on the first sending time, the first receiving time, the second sending time, and the second receiving time; and
performing, by the first network device, (1) to (4) for N times in the first periodicity, to obtain the N pieces of first round-trip time.

17. The non-transitory computer-readable medium according to claim 16, wherein the determining, by the first network device, the first round-trip time based on the first sending time, the first receiving time, the second sending time, and the second receiving time comprises:

$RTT = t_2 - t_1 + t_4 - t_3$, wherein:

RTT represents the first round-trip time, $t_2$ represents the first receiving time, $t_1$ represents the first sending time, $t_4$ represents the second receiving time, and $t_3$ represents the second sending time.

18. The non-transitory computer-readable medium according to claim 16, wherein the determining, by the first network device, an inter-site synchronization offset value of the first periodicity based on the minimum first round-trip time reference value comprises:

$Offset = t_{2min} - t_{1min} - RTT_{min}/2$, wherein:

Offset represents the inter-site synchronization offset value of the first periodicity, $t_{2min}$ represents first receiving time corresponding to the minimum first round-trip time reference value, $t_{1min}$ represents first sending time corresponding to the minimum first round-trip time reference value, and $RTT_{min}$ represents the minimum first round-trip time reference value.

19. The non-transitory computer-readable medium according to claim 15, wherein the operations further comprise:
obtaining, by the first network device, M pieces of round-trip time in a second periodicity, wherein M is less than N, and the second periodicity is less than the first periodicity;
determining, by the first network device, a minimum first round-trip time real-time value based on the M pieces of round-trip time, wherein the minimum first round-trip time real-time value is a smallest value of the M pieces of round-trip time; and
determining, by the first network device, an inter-site synchronization offset value of the second periodicity based on the minimum first round-trip time real-time value, wherein a difference between the minimum first round-trip time real-time value and the minimum first round-trip time reference value is less than a preset threshold.

20. The non-transitory computer-readable medium according to claim 15, wherein the operations further comprise:
obtaining, by the first network device, an air interface offset measurement value, wherein the air interface offset measurement value is a synchronization offset value that exists when the first network device and the second network device transmit packets through an air interface;
determining, by the first network device, a static error value based on the air interface offset measurement value and the inter-site synchronization offset value of the first periodicity, wherein the static error value is a fixed value of a delay offset that exists when the first network device and the second network device transmit packets; and
storing, by the first network device, the static error value.

* * * * *